United States Patent
Maria

(10) Patent No.: US 10,687,212 B2
(45) Date of Patent: Jun. 16, 2020

(54) MOBILE NETWORK CORE COMPONENT FOR MANAGING SECURITY KEYS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 425 days.

(21) Appl. No.: 15/481,724

(22) Filed: Apr. 7, 2017

(65) Prior Publication Data
US 2018/0295505 A1   Oct. 11, 2018

(51) Int. Cl.
| | |
|---|---|
| *G06F 21/00* | (2013.01) |
| *H04W 12/04* | (2009.01) |
| *H04L 9/08* | (2006.01) |
| *H04W 12/02* | (2009.01) |
| *H04L 9/14* | (2006.01) |
| *G06F 21/60* | (2013.01) |

(52) U.S. Cl.
CPC .......... *H04W 12/04* (2013.01); *G06F 21/602* (2013.01); *H04L 9/0891* (2013.01); *H04L 9/14* (2013.01); *H04W 12/02* (2013.01); *H04L 2209/76* (2013.01)

(58) Field of Classification Search
CPC ........ H04W 12/04; H04W 12/02; H04L 9/14; H04L 9/0891; H04L 2209/76; G06F 21/602
See application file for complete search history.

(56) References Cited

U.S. PATENT DOCUMENTS

| | | | |
|---|---|---|---|
| 6,453,159 B1* | 9/2002 | Lewis | H04L 63/0428 455/411 |
| 9,148,283 B1 | 9/2015 | Shankar | |
| 9,413,730 B1* | 8/2016 | Narayan | H04L 63/0471 |
| 9,485,231 B1 | 11/2016 | Reese | |
| 9,497,572 B2 | 11/2016 | Britt | |
| 9,503,969 B1 | 11/2016 | Zakaria | |
| 2009/0300356 A1 | 12/2009 | Crandell | |
| 2016/0182471 A1* | 6/2016 | Wilson | H04L 63/105 713/164 |
| 2016/0205078 A1 | 7/2016 | James | |
| 2016/0241390 A1 | 8/2016 | Harris | |
| 2016/0323736 A1* | 11/2016 | Donahue | H04W 12/04 |
| 2016/0337322 A1 | 11/2016 | Kang | |
| 2016/0366102 A1 | 12/2016 | Smith | |

(Continued)

FOREIGN PATENT DOCUMENTS

CA   103166919 A   6/2013

*Primary Examiner* — Kendall Dolly
(74) *Attorney, Agent, or Firm* — Kilpatrick Townsend & Stockton LLP

(57) ABSTRACT

A security keys broker residing on a core mobile communication network may manage security keys associated with network-enabled devices, such as Internet-of-Things devices. The security keys broker may authenticate, encrypt, or decrypt communications with the network-enabled devices using the associated security keys. Characteristics of the communications with the network-enabled devices may be determined, and the security keys broker may determine insecure communications based on the characteristics. Responsive to determining that an insecure communication has occurred, the security keys broker may update one or more of the security keys.

18 Claims, 8 Drawing Sheets

(56) References Cited

U.S. PATENT DOCUMENTS

| | | |
|---|---|---|
| 2016/0366111 A1 | 12/2016 | Smith |
| 2017/0006006 A1 | 1/2017 | Rawcliffe |
| 2017/0006135 A1 | 1/2017 | Siebel |
| 2017/0013453 A1 | 1/2017 | Lee |

* cited by examiner

US 10,687,212 B2

MOBILE NETWORK CORE COMPONENT FOR MANAGING SECURITY KEYS

FIELD OF THE INVENTION

This disclosure relates generally to the field of mobile communication network security, and more specifically relates to authenticating communications to and from network-enabled devices.

BACKGROUND

Communications networks, including a core mobile communication network ("mobile network" or "core mobile network"), carry traffic for a large number of networked devices. An increasing portion of the communication traffic is transmitted to and from network-enabled devices with little or no user input. Network-enabled devices of this type, such as Internet-of-Things ("IoT") devices, may transmit information related to the device itself, or related to the environment of the device. In some cases, the information may be unassociated with a user, or it may be associated with a user account rather than to a person's particular request for information. Information may be transmitted to or from network-enabled devices or an application server, such as an application server operated by an organization associated with the network-enabled devices. The organization associated with a network-enabled device may provide services related to the device, such as remote monitoring or maintenance services.

Network-enabled devices may serve specialized functions, such as receiving data from sensors or providing control signals to other devices (e.g., receiving temperature data from and providing control signals to a thermostat). The network-enabled device may be relatively small or simple, such as a device including few components and/or with low-end capabilities. The simplicity of such network-enabled devices may cause the devices to have few or no security measures. Unfortunately, a lack of security may leave the network-enabled devices open to being compromised or disabled. A compromised network-enabled device may be used in a security attack, including a physical attack (e.g., disabling all streetlights in a target area) or a network-based attack (e.g., commanding a large number of compromised devices to communicate with a target server system).

Current solutions for securing communications with a network-enabled device include using security keys to encrypt or authenticate communications to and from the network-enabled device. An encrypted communication may improve security of the communication or of related systems, such as the network-enabled device. However, the security key itself may be stored insecurely (e.g., unencrypted) on the network-enabled device. In addition, updates or maintenance operations may transmit the security key insecurely on a network (e.g., the Internet).

As noted, a network-enabled device may not have the sophistication to provide security for itself. In addition, a company that provides network-enabled devices or associated services may lack the resources or inclination to provide security. An application server that is configured to recognize unusual behavior may be limited to analyzing the behavior of network-enabled devices that communicate with the application server (e.g., only devices associated with a company running the application server). Attacks that are organized using network-enabled devices from multiple groups (e.g., multiple device types, multiple companies) may not be detected by an application server associated with a particular group.

It is desirable to provide security for communications with a network-enabled device. In addition, it is desirable to provide security that minimizes the complexity or cost of the network-enabled device. Furthermore, it is desirable to recognize unusual behavior that is associated with network-enabled devices from more than one group.

SUMMARY

A security key broker ("SKB") may reside on a mobile network. The SKB may be capable of storing security keys that are associated with network-enabled devices. A particular network-enabled device may communicate with the SKB via a segment of the mobile network, such as via an access point name ("APN"). The communication may be authenticated via the segment. After authenticating the communication, the SKB may encrypt the communication using a security key associated with the particular network-enabled device. The encrypted communication may be sent to a recipient, such as an application server residing outside of the mobile network. Encrypted communications transmitted to the network-enabled device may be received by the SKB and decrypted using the associated security key. The decrypted communication may be sent to the network-enabled device via the segment of the mobile network.

The SKB may receive communications related to maintenance or updates of the network-enabled device. For example, an application server may send to the SKB an indication that the security key associated with a particular network-enabled device is to be modified (e.g., replaced or updated). The SKB may modify the security key. Additional communications with the network-enabled device may be encrypted or decrypted using the modified security key.

The SKB may transmit multiple communications related to one or more groups of network-enabled devices. Based on the multiple communications, the SKB may monitor and analyze the communications to determine characteristics of a set of the communications. The SKB may receive additional communications with characteristics other than the determined characteristics (e.g., unusual characteristics). Responsive to determining that the additional communications have the other characteristics, the SKB may provide a response. For example, the SKB may modify one or more of the stored security keys, such as the security keys for network-enabled devices associated with the additional communications.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

The described implementations provide techniques for managing security keys for communications transmitted via a mobile network. The communications may be transmitted to and from network-enabled devices and application servers. An SKB may store the security keys, and encrypt or decrypt communications with a network-enabled device using an associated security key. The SKB may authenticate communications with the network-enabled device via associated segmentation of the mobile network. In addition, the SKB may determine characteristics of communications transmitted to and from the network-enabled devices and application servers. Responsive to determining that one or more communications have other characteristics (e.g., unusual characteristics), the SKB may modify one or more of the stored security keys.

As used herein, the term "network-enabled device" includes a device, such as an IoT device, that is capable of transmitting data via a network. In some implementations, the device may operate with little or no input from a human user. Non-limiting examples of network-enabled devices include weather sensors, traffic sensors, home-control modules (e.g., remote-controlled heating/cooling devices, "smart" home appliances), maintenance modules (e.g., requesting services based on sensor inputs), or any other suitable function. Network-enabled devices may be associated with a human user (e.g., a wearable health monitor), with a user profile (e.g., multiple devices related to a user), with a non-human user (e.g., "smart" streetlights for a town), or with no user (e.g., weather sensors).

As used herein, the term "application server" includes a computer system that communicates with one or more network-enabled devices. An application server may include one or more computing devices, such as one or more servers, processors, databases, or other suitable computing devices. An application server may receive information from a network-enabled device, such as data gathered by the device. In addition, an application server may provide information to a network-enabled device, such as operation instructions. In some cases, an application server associates the network-enabled device with a user (including non-human users) or a user profile.

An application server or group of application servers may be operated by an organization (e.g., company, government agency) that is associated with a group of network-enabled devices. For example, an application server may be operated by an organization that manufactures and provides a group of network-enabled devices (e.g., a health company that sells wearable health monitors). In addition, an application server may be operated by an organization that provides services related to a group of network-enabled devices (e.g., a swimming pool maintenance company that receives updates from pool monitors).

Figure 1:
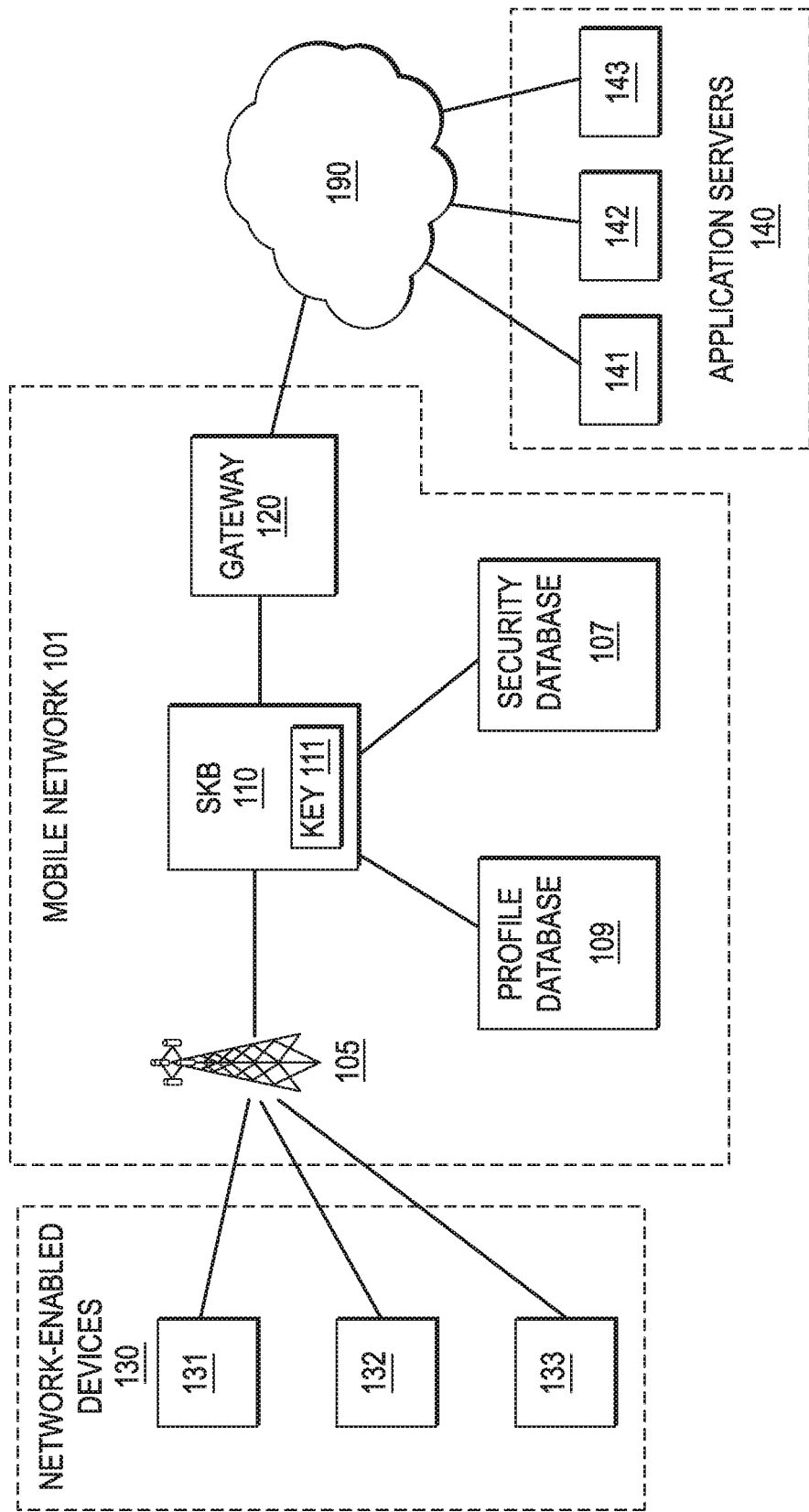
FIG. 1 is a block diagram depicting an exemplary system capable of managing security keys related to network-enabled devices.

The following examples are provided to introduce certain features of the present disclosure. Referring now to the drawings, FIG. 1 depicts an exemplary system capable of managing security keys related to network-enabled devices. Mobile network 101 may comprise a core mobile network that enables communication of mobile devices using an evolved packet core architecture on a long-term evolution standard ("LTE EPC network"). Mobile network 101 may include one or more mobile communication nodes, such as node 105, one or more mobile communication gateways, such as gateway 120, and one or more SKBs, such as SKB 110. The node 105 may be a radio access node (e.g., a "cell tower"), a wireless access point, or any other suitable type of communications node. In some cases, the SKB 110 and the gateway 120 may have alternative configurations. For example, the gateway 120 may be connected with the node 105 and SKB 110, and the SKB 110 may be connected with an additional network 190, which is outside the core mobile network 101. In addition, SKB 110 and gateway 120 may comprise a single multi-function network component.

Additional systems may communicate via the mobile network 101. For example, one or more network-enabled devices 130 may communicate via mobile communications node 105. The network-enabled devices 130 may each include components capable of communicating with the mobile network 101. For example, each of the network-enabled devices 131, 132, and 133 may include a respective LTE modem, subscription identification module ("SIM") card, or other suitable components. In addition, each of the network-enabled devices 131, 132, and 133 may have an authorization to communicate via the mobile network 101, such as an active subscription or account.

In addition, one or more application servers 140, including application servers 141, 142, at 143, may communicate with devices in the core mobile network 101 via gateway 120. Communications with the mobile network 101 may be transmitted via additional networks outside of the mobile network 101, such as network 190. Such additional networks may include additional mobile networks, the Internet, one or more private networks, or other suitable networks. Although network 190 is depicted as being connected with gateway 120 and application servers 140, other configurations are possible.

Communications to and from the network-enabled devices 130 and the application servers 140 may be transmitted via mobile network 101. For example, a network-enabled device 131 may transmit a first communication to application server 141. The first communication may be received by node 105, and passed to SKB 110. The first communication may be authenticated by one or more components of mobile network 101, such as by gateway 120 or SKB 110. The SKB 110 may encrypt the authenticated communication using a security key 111 associated with the network-enabled device 131. The SKB 110 may transmit the encrypted communication to one or more of gateway 120 and network 190. Application server 141 may receive the encrypted communication.

In addition, the application server 141 may transmit a second communication to network-enabled device 131. In some cases, the second communication may be encrypted. The second communication may be received by gateway 120, and passed to SKB 110. The second communication may be authenticated by mobile network 101, such as by gateway 120 or SKB 110. The SKB 110 may decrypt the second communication using the security key 111, and transmit the decrypted communication to the network-enabled device 131 via node 105.

Some communications may be intended for the SKB. For example, the application server 141 may transmit a third communication to SKB 110. The third communication may indicate that security key 111 is to be modified. Responsive to receiving the third communication, SKB 110 may modify security key 111, such as by updating security key 111 to have a new or additional value. Additional communications transmitted to or from the network-enabled device 131 may be decrypted or encrypted using the modified security key. In addition, the SKB 110 may receive communications indicating one or more parameters related to the network-enabled devices, such as a parameter indicating a user profile or a network address.

In some implementations, the SKB 110 may communicate with additional components of an LTE EPC network. For example, mobile network 101 may include one or more profile database 109 having user profiles, such as a home subscriber server. The profile database 109 may provide the SKB 110 with subscriber information, such as a subscription status for the network-enabled device 131. In addition, mobile network 101 may include one or more security database 107. The security database 107 may provide the SKB 110 with data related to security, such as domain certificates, public key infrastructure ("PKI") certificates or keys, and other appropriate types of data. In addition, SKB 110 may communicate with additional components of mobile network 101, such as modules related to public switched telephone network connectivity (e.g., landlines), or modules related to quality of service ("QoS") policies. The SKB may communicate with such components via other components of the mobile network 101. For example, although FIG. 1 depicts SKB 110 as communicating with profile database 109 and security database 107 via connections, SKB 110 may communicate via the gateway 120.

Figure 2:
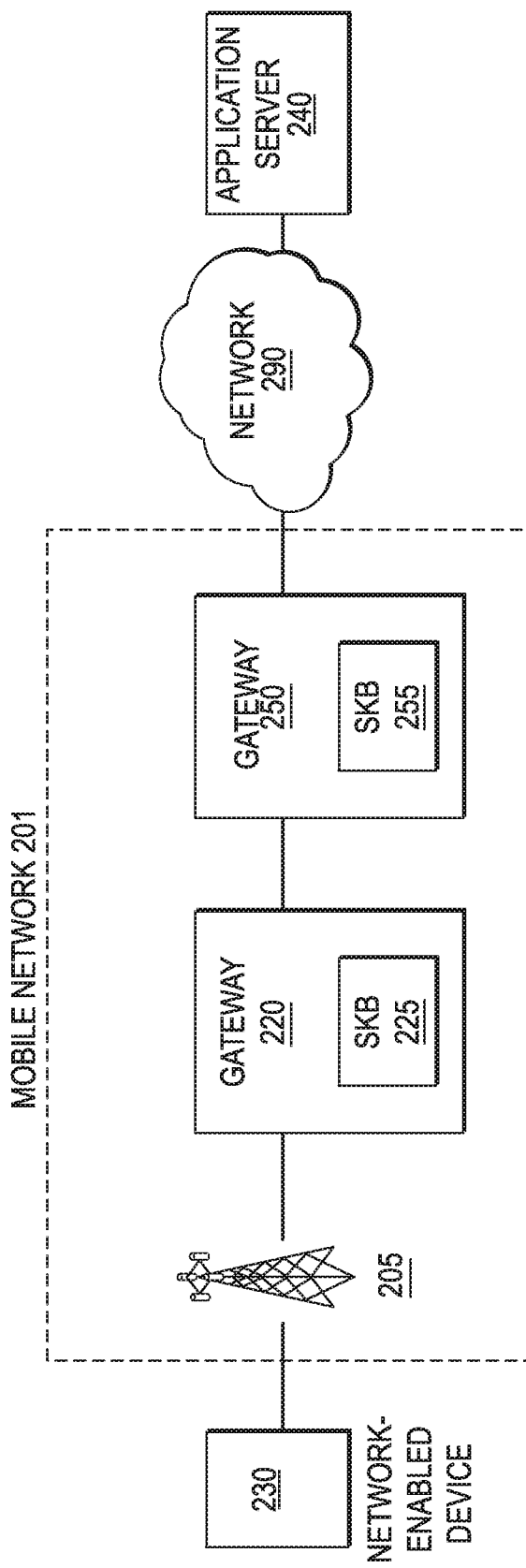
FIG. 2 is a block diagram depicting an exemplary system capable of managing security keys using a distributed SKB.

In some configurations, an SKB may be distributed across one or more components of a core mobile network. For example, an SKB may be included in one or more gateways. FIG. 2 depicts an exemplary system capable of managing security keys using a distributed SKB. An LTE EPC network comprising multiple gateways, such as mobile network 201, may include one or more mobile communication nodes, such as node 205, and one or more mobile communication gateways, such as gateways 220 and 250. Additional systems may communicate via mobile network 201, such as a network-enabled device 230 or an application server 240. Communications with the mobile network 201 may be transmitted via additional networks, including networks outside of the mobile network 201, such as network 290. For example, a communication from application server 240 may be transmitted to gateway 250 via network 290.

The gateway 220 may be a serving gateway ("S-gateway"). Gateway 220 may include SKB 225, such as a front-end processor or module. SKB 225 included in gateway 220 may receive communications intended for one or more components of mobile network 201. For example, SKB 225 may receive communications indicating that a security key is to be updated, or indicating parameters related to network-enabled devices. In addition, either of gateway 220 or SKB 225 may route communications to other components within network 201, such as to gateway 250. Routed communications may be authenticated by either of gateway 220 or SKB 225.

Gateway 250 may be a packet data network gateway ("P-gateway"). Gateway 250 may include SKB 255. In addition, SKB 255 may be configured as a front-end processor or module within the gateway 250. SKB 255 may receive communications intended for recipients outside of mobile network 201, such as application server 240. For example, SKB 255 may receive a communication including instructions for network-enabled device 230. SKB 255 may decrypt the communication using a security key associated with network-enabled device 230. Gateway 250 may authenticate the communication as being associated with network-enabled device 230. For example, gateway 250 may determine an access point name ("APN") associated with the communication. Responsive to determining that the access point name is associated with the network-enabled device 230, the decrypted and authenticated communication may be transmitted to the network-enabled device 230.

An SKB, including a distributed SKB, may include dedicated network components, such as one or more stand-alone servers configured to perform functions related to the SKB. In addition, the SKB may include virtual network components, such as one or more SKB components implemented as virtual network functions on one or more computing systems. One or more of the dedicated or virtual network components may be associated with additional components of the mobile network. For example, either a dedicated or a virtual SKB may the configured as a front-end processor for a gateway.

In-Band/Out-of-Band Communication

An SKB may use multiple channels of communication to transmit information to one or more of a network-enabled device or an application server. Channels of communication may include different types of channels, such as a data connection capable of carrying data packets, a private data connection (e.g., a connection using different encryption, a segmented connection, a connection within a private network), a voice connection capable of carrying audible data, a short messaging service ("SMS") capable of transmitting SMS messages (e.g., text messages), a multimedia messaging service ("MMS") capable of transmitting MMS messages (e.g., data messages), a control plane capable of carrying data related to operations or management of the mobile network, or any other suitable channel type.

Figure 3:
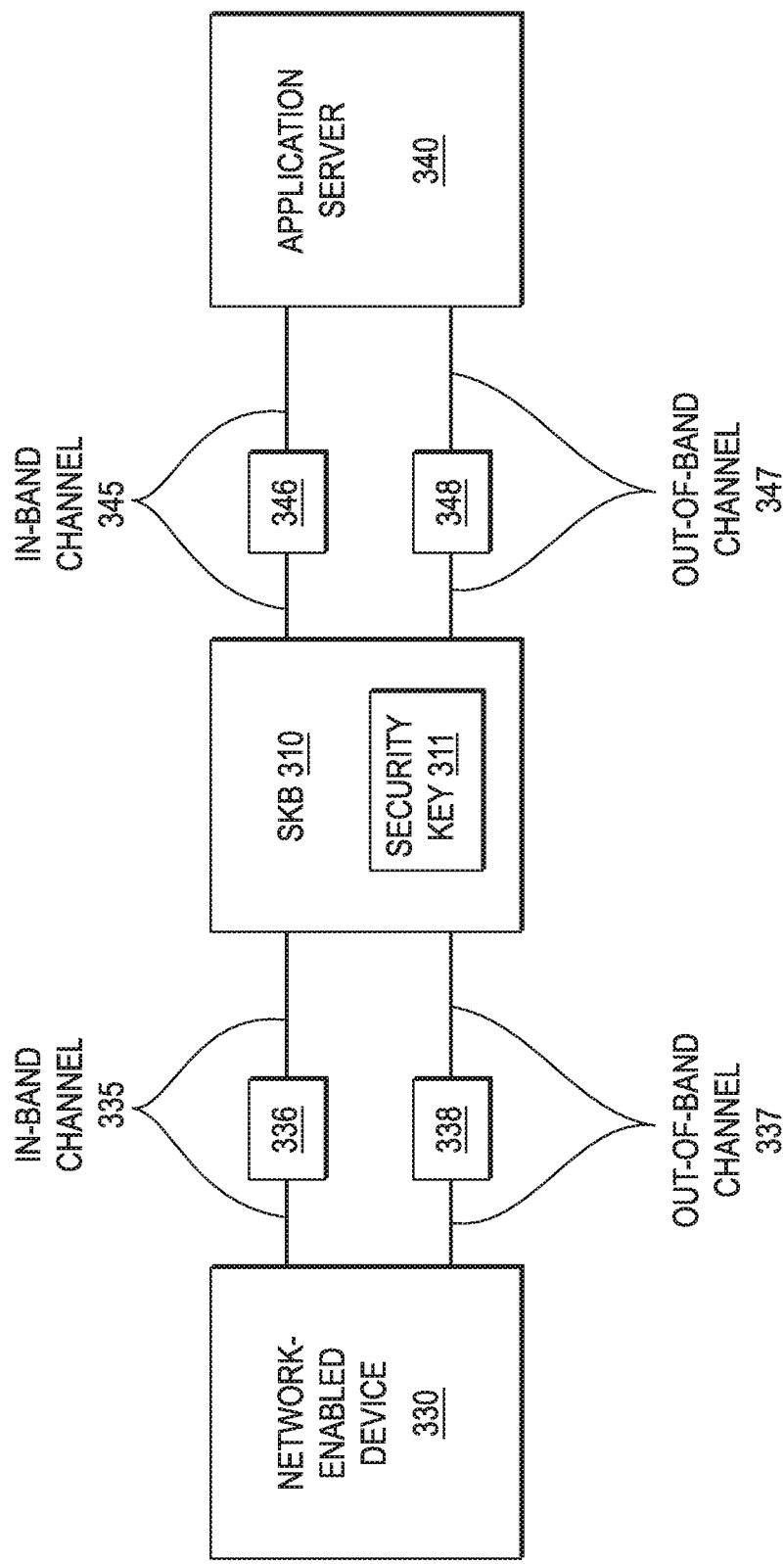
FIG. 3 is a diagram depicting an exemplary system capable of using multiple channels of communication to manage security keys.

FIG. 3 depicts an exemplary system capable of using multiple channels of communication to manage security keys. An SKB 310, such as an SKB residing within a mobile network, transmits communications between a network-enabled device 330 and an application server 340. The communications may be transmitted via one or more additional networks or one or more additional components of the mobile network, such as described with regards to FIGS. 1 and 2.

The SKB 310 may have multiple channels by which to transmit communications. For example, the SKB 310 and the network-enabled device 330 may communicate via one or more of an in-band channel 335 and an out-of-band channel 337. In addition, the SKB 310 and the application server 340 may communicate via one or more of an in-band channel 345 and an out-of-band channel 347. In addition, SKB 310 may include a security key 311 associated with network-enabled device 330.

A communication 336 may be transmitted to or from network-enabled device 330 or SKB 310 via in-band channel 335. The in-band channel 335 may be a data connection. The communication 336 may include data packets related to the functions of network-enabled device 330 or application server 340. For example, communication 336 may include temperature data provided by a device sensor, or instructions provided by the application server 340 to modify a thermostat setting.

A communication 338 may be transmitted to or from network-enabled device 330 or SKB 310 via out-of-band channel 337. The out-of-band channel 337 may be one or more of a control plane channel, an SMS message, or any other suitable channel type. The communication 338 may include data related to the internal operation of network-enabled device 330. For example, communication 338 may include one or more of an operation parameter (e.g., an expiration timestamp for security key 311, a value for a device setting), an operation instruction (e.g., an instruction to update a memory value), or an acknowledgment of an instruction received by the network-enabled device 330.

A communication 346 may be transmitted to or from application server 340 or SKB 310 via in-band channel 345. The in-band channel 345 may be a data connection. The communication 346 may include data packets related to the functions of network-enabled device 330 or application server 340. For example, communication 346 may include instructions for the network-enabled device 330 provided by the application server 340, or data provided by the network-enabled device 330.

A communication 348 may be transmitted to or from application server 340 or SKB 310 via out-of-band channel 347. The out-of-band channel 347 may be one or more of a private data connection, a control plane channel, an SMS message, or any other suitable channel type. The communication 348 may include information related to the internal operation of one or more of network-enabled device 330 or application server 340. For example, communication 348 may include an operation instruction, such as an instruction to modify security key 311. In addition, communication 348 may include one or more of an indication that the security key 311 has been modified, or information related to the modification (e.g., an alert indicating potentially malicious activity). In addition, communication 348 may include one or more of an operation parameter (e.g., an expiration timestamp for security key 311, a value for an APN), or an acknowledgment of an instruction (e.g., confirmation of a modification to security key 311).

Figure 4:
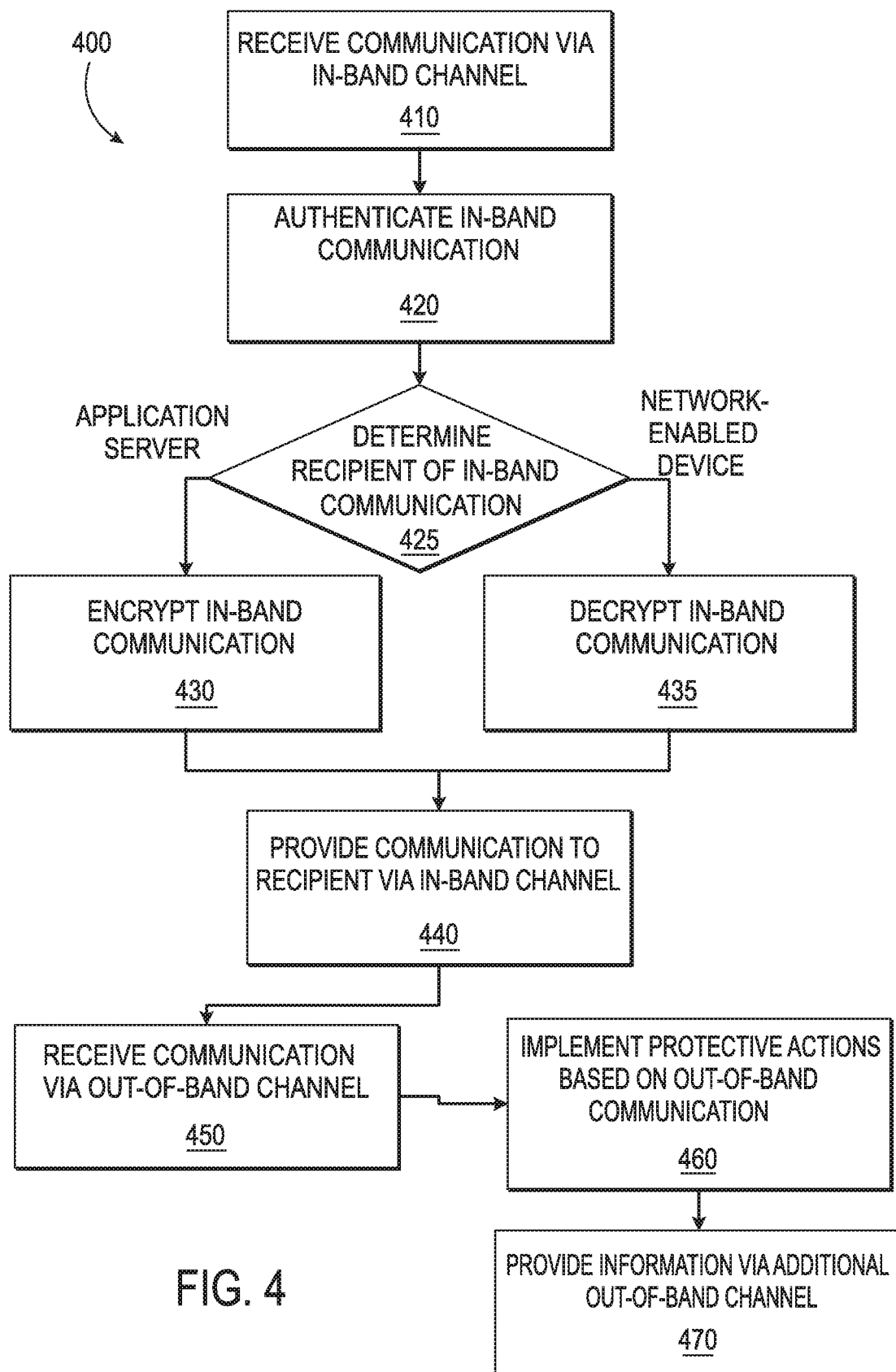
FIG. 4 is a flow chart depicting an example of a process for using multiple communication channels for managing security keys.

FIG. 4 is a flow chart depicting an example of a process 400 for using multiple communication channels for managing security keys. In some implementations, such as described in regards to FIGS. 1-3, a computing device executing a security key broker implements operations described in FIG. 4, by executing suitable program code. For illustrative purposes, the process 400 is described with reference to the examples depicted in FIGS. 1-3. Other implementations, however, are possible.

A computing device implementing an SKB on a mobile network may transmit communications to a network-enabled device or an application server. The communications transmitted by the SKB may be transmitted via one or more types of channels of the mobile network. At block 410, the process 400 involves receiving a first communication via an in-band channel of a mobile network. The in-band channel may comprise a data connection or other suitable channel type. In addition, the first communication may comprise packets transmitted via the data connection. The first communication may be intended for a recipient outside of the mobile network, such as a network-enabled device or an application server.

At block 420, the process 400 involves authenticating the first communication. For example, the first communication may be authenticated by determining an APN associated with the communication. The APN may indicate a segment of the mobile network that is associated with either the network-enabled device, the application server, or both.

At block 425, the process 400 involves determining a recipient of the first communication. For example, the first communication may indicate that the network-enabled device is the intended recipient. Alternatively, the first communication may indicate that the application server is the intended recipient.

At block 430, the process 400 involves encrypting data included in the authenticated communication. For example, a security key associated with the network-enabled device may be used to encrypt the authenticated communication. Operations related to block 430 may be performed responsive to determining that the intended recipient of the communication is the application server.

At block 435, the process 400 involves decrypting data included in the authenticated communication. For example, the security key associated with the network control device may be used to decrypt the authenticated communication. Operations related to block 435 may be performed responsive to determining that the intended recipient of the communication is the network-enabled device. Some cases, operations related to block 430 may be omitted, such as if the data is not encrypted.

At block 440, the process 400 involves providing, on an in-band channel of the mobile network, the authenticated communication. The authenticated communication may be provided to the intended recipient, such as the application server or the network-enabled device. Operations related to blocks 410, 420, 425, 430, 435, and 440 may be repeated, such as for additional communications.

An SKB may modify security information associated with the network-enabled device. For example, the SKB may receive an instruction to modify a security key, such that additional communications with the network-enabled device are encrypted using the modified key. At block 450, the process 400 involves receiving, on an out-of-band channel of the mobile network, a second communication, such as from the application server. The out-of-band channel may comprise a private data connection, an SMS message, a control plane, or other suitable channel type. In addition, the second communication may indicate a modification to security information associated with the network-enabled device. The second communication may be intended for the SKB, or another component within the mobile network.

At block 460, the process 400 involves implementing one or more protective actions. The protective actions may be implemented based on information included in the second communication. For example, based on an indicated modification included in the second communication, a security key value may be updated. Other protective actions may include adding an expiration timestamp to the security information, or modifying other parameters of the security information.

At block 470, the process 400 involves providing, on an additional out-of-band channel, information regarding the modification to the network-enabled device. The additional out-of-band channel may have a type similar to or different from the out-of-band channel described in regards to block 450. The provided information may include the modification, such as by providing the updated security key to the network-enabled device, or may describe the modification, such as an alert describing an updated expiration timestamp. In some cases, operations related to block 470 may be omitted.

Network Segmentation

Transmissions with one or more of a network-enabled device or an application server may be segmented on the mobile network. For example, components within the mobile network, such as a gateway or an SKB, may determine an APN for a received communication. The APN may indicate a segment of the network on which the communication is authorized to be transmitted. In some cases, a communication having an unknown APN, or no APN, may be refused by the mobile network.

Figure 5:
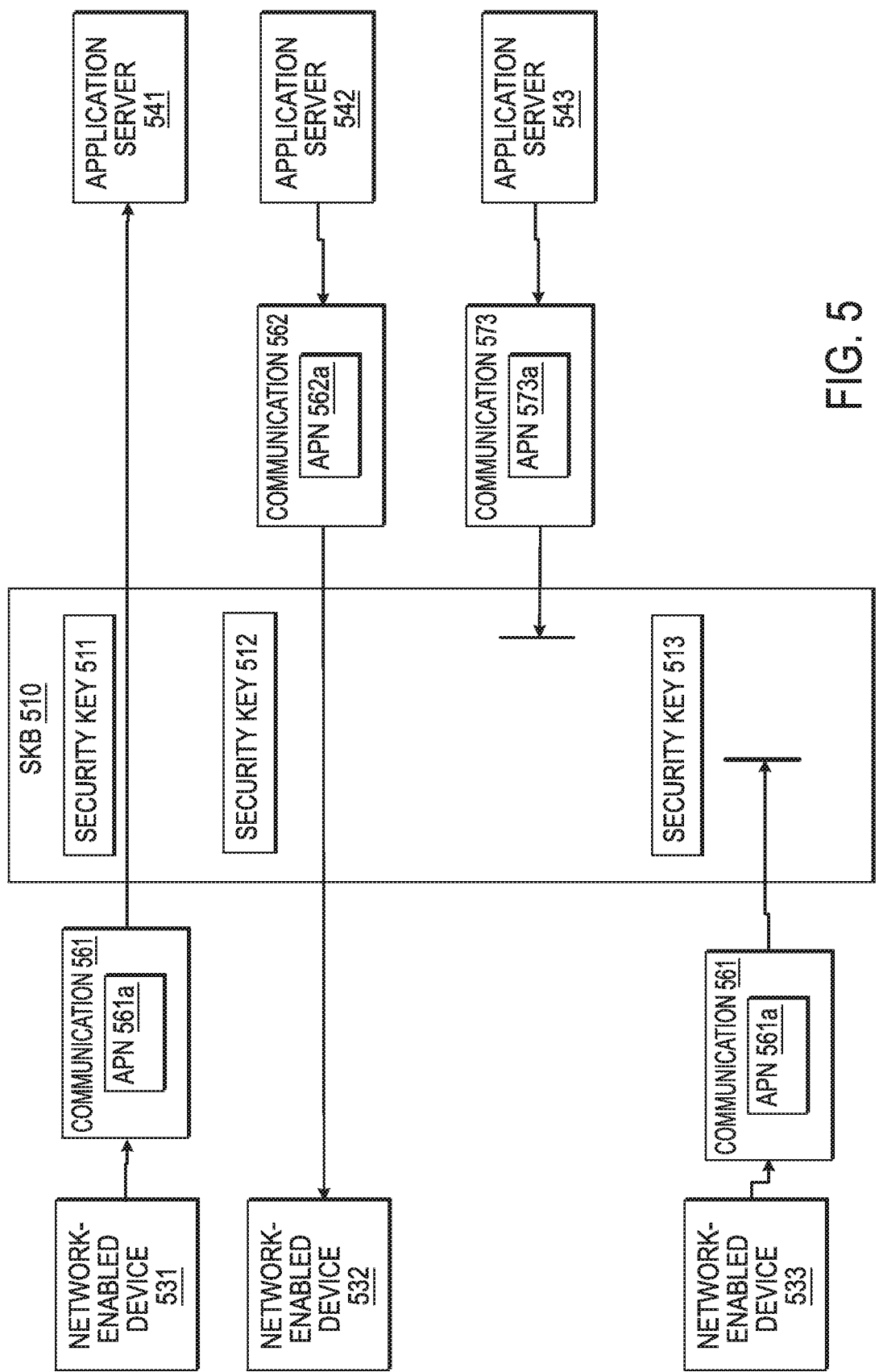
FIG. 5 is a diagram depicting an exemplary system capable of authenticating communications on a mobile network via network segmentation.

FIG. 5 depicts an example of a system capable of authenticating communications on a mobile network via network segmentation. The system may include an SKB 510, which resides within a mobile network. For simplicity, the SKB 510 is depicted as including features related to encryption, decryption, and network segment authentication. However, other configurations are possible. For example, features related to network segment authentication may be performed by additional mobile network components, such as one or more gateways. In addition, the features described with regards to SKB 510 may be included in a multi-purpose component of the mobile network.

Systems outside of the mobile network may transmit, or attempt to transmit, communications via SKB 510. For example, network-enabled devices 531, 532, and 533 may each provide a communication. In addition, application servers 541, 542, and 543 may each provide a communication. The communications may be received by SKB 510. In addition, SKB 510 may determine a network segment associated with each received communication based on an APN associated with the respective communication. For example, SKB 510 may compare an APN to a list of known APNs accessible by SKB 510. In addition, SKB 510 may provide a received APN to an additional network component, and receive from the additional component an indication whether the APN is associated with a network segment.

Network-enabled device 531 may provide a communication 561, including APN 561a. The SKB 510 may receive the communication 561, and determine a valid network segment of mobile network 501 based on the APN 561a. In addition, the SKB 510 may determine that the APN 561a is associated with application server 541.

Responsive to determining that communication 561 has a valid APN 561a, the SKB 510 may transmit or modify the communication 561. For example, SKB 510 may transmit the communication 561 to application server 541. In addition, SKB 510 may modify the communication 561, such as by encrypting the communication using security key 511 associated with the network-enabled device 531.

Application server 542 may provide a communication 562, including APN 562a. The SKB 510 may receive the communication 562, and determine a valid network segment of mobile network 501 based on the APN 562a. In addition, the SKB 510 may determine that the APN 562a is associated with network-enabled device 532. Responsive to determining the communication 562 has a valid APN 562a, the SKB 510 may transmit communication 562 to network-enabled device 532. In addition, SKB 510 may decrypt communication 562, such as by using security key 512 associated with network-enabled device 532.

Application server 543 may provide a communication 573, including APN 573a. The SKB 510 may receive the communication 573, and determine that APN 573a is not associated with a valid network segment of mobile network 501. Responsive to determining that the communication 573 has an invalid APN 573a, SKB 510 may decline to transmit the communication 573. For example, SKB 510 may provide an error message to application server 543. In addition, SKB 510 may discard the communication 573 (e.g., delete data, drop the connection).

Network-enabled device 533 may provide a communication 563, including APN 563a. The SKB 510 may receive the communication 563, and determine that APN 563a is not associated with a valid network segment. Responsive to determining that the communication 563 has an invalid APN 563a, SKB 510 may discard or decline to transmit the communication 563. In addition, SKB 510 may decline to modify communication 563 using security key 513 associated with network-enabled device 533.

In some implementations, an APN associated with either a network-enabled device or an application server may be updated via a communication from an SKB. For example, an SKB may provide a communication to one or more of a network-enabled device or an application server, indicating a modification of the recipient's APN. The communication may be transmitted via an out-of-band channel. Responsive to receiving the out-of-band communication, the recipient may modify its operation, such as by updating of value for its APN.

Protocol Translation

In some cases, a network-enabled device may have non-standard components (e.g., out-of-date software or firmware, third-party devices). Communications from such non-standard network-enabled devices may include data that is not recognized by an application server, or includes data in a format that is outdated. In some cases, a non-standard communication may have security vulnerabilities that are not present in standardized communications (e.g., a security vulnerability eliminated by an update).

An SKB may perform translation of content included in a communication from either a network-enabled device or an application server. For example, an SKB residing within a mobile network may receive a communication, and determine that the communication is associated with a non-standard network-enabled device. The SKB may translate information included in the communication. In addition, SKB may transmit the translated communication to the recipient.

Figure 6:
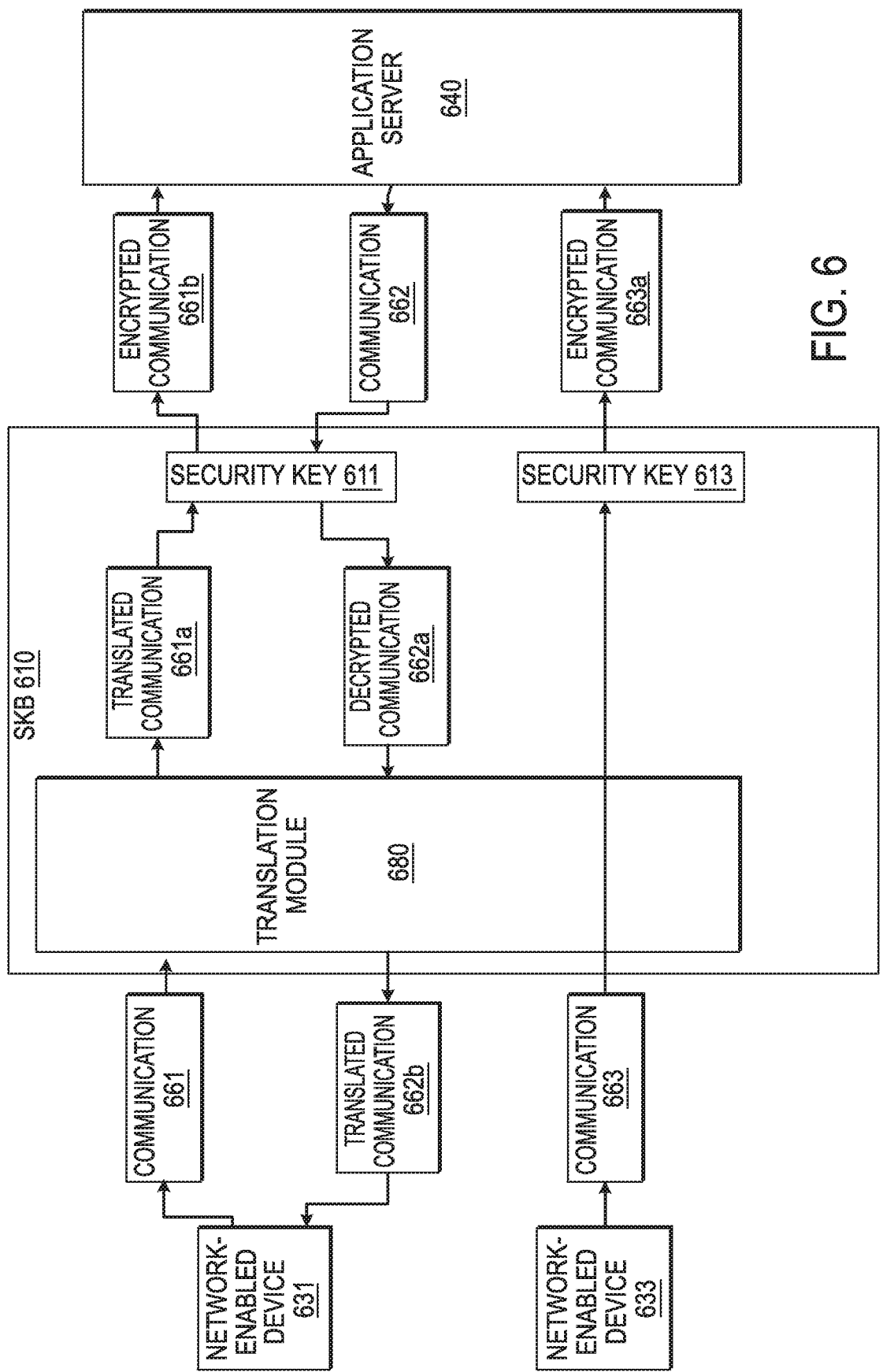
FIG. 6 is a diagram depicting an exemplary system capable of translating communications on a mobile network.

FIG. 6 depicts an example of a system capable of translating communications transmitted via a mobile network. The system may include an SKB 610, which resides within a mobile network 61. For simplicity, the SKB 610 is depicted as including features related to encryption, decryption, and translation. However, other configurations are possible. For example, features related to translation may be performed by additional mobile network components, such as a translation module. In addition, the features described with regards to SKB 610 may be included in a multi-purpose component of the mobile network.

SKB 610 may include security keys 611 and 613, associated with respective network-enabled devices 631 and 633. In addition, SKB 610 may include translation module 680. Application server 640 and network-enabled devices 631 and 633 may communicate via SKB 610. Translation module 680 may provide translation of such communications.

For example, network-enabled device 631 may transmit a communication 661. Translation module 680 included in SKB 610 may determine that the communication 661 has a first type of format and content. For example, based on the content of communication 661, translation module 680 may determine that network-enabled device 631 has out-of-date firmware (e.g., is non-standard). Responsive to determining that the communication has the first type of format and content, translation module 680 may modify communication, such that translated communication 661a has a second type of format and content. Translation module 680 may determine the second type based on one or more of information received from application server 640, information accessible via additional components within the mobile network of SKB 610, information accessible via a computing system outside of the mobile network (e.g., a third-party standards server), or any other suitable source of information. SKB 610 may authenticate one or more of the communications 661 or 661a, such as by determining an associated APN. In addition, SKB 610 may encrypt the translated communication 661a, such as by using security key 611. SKB 610 may provide the encrypted communication 661b to application server 640.

Application server 640 may transmit a second communication 662. SKB 610 may authenticate communications 662, or decrypt it using security key 611. The decrypted communication 662a may be provided to translation module 680. Translation module 680 may determine that the intended recipient of communication 662a is non-standard. For example, based on information previously received from device 631, translation module 680 may determine that network-enabled device 631 receives communications having the first type of format and content (e.g., is non-standard). Responsive to determining that network-enabled device 631 receives the first type of communications, translation module 680 may translate decrypted communication 662a. For example, translated communication 662b may have the first type of format and content (e.g., recognizable by network-enabled device 631). SKB 610 may provide the translated communication 662b to network-enabled device 631.

Network-enabled device 633 may transmit a communication 663. Translation module 680 included in SKB 610 may determine that the communication 663 has the second type of format and content (e.g., is standard). Responsive to determining that the communication is of the second type, translation module 680 may pass communication 663 through without translation. SKB 610 may perform one or more of authenticating or encrypting the communication 663, such as by using security key 613. SKB 610 may provide the encrypted communication 663a to application server 640.

Group Modification of Security Keys

In some implementations, an SKB may transmit communications to or from multiple groups of network-enabled devices and multiple application servers. The SKB may determine a pattern of behavior associated with the multiple groups and multiple application servers. For example, the SKB may monitor and analyze communications between a particular application server and group of network-enabled devices. Based on the analysis, the SKB may determine that communications between the particular application server and group have one or more characteristics. Such characteristics may include a time of day associated with the transmissions, an amount of data in each transmission, a network address for a source or recipient, or other suitable characteristics. The SKB may associate the characteristics or the analyzed communications with a history of activity for the application server, for the group, or for both.

The SKB may receive additional communications. The additional communications may appear to be associated with a particular group of network-enabled devices or a particular application server. However, the SKB may determine that the additional communications lack the characteristics associated with the particular group or particular application server. The SKB may determine that the communications lacking the characteristics are insecure. Responsive to determining that the additional communications are insecure, the SKB may implement protective actions. For example, the SKB may update security keys associated with the particular group of network-enabled devices. In addition, the SKB may provide a notification to the particular application server, such as an alert indicating a potential attack.

Figure 7:
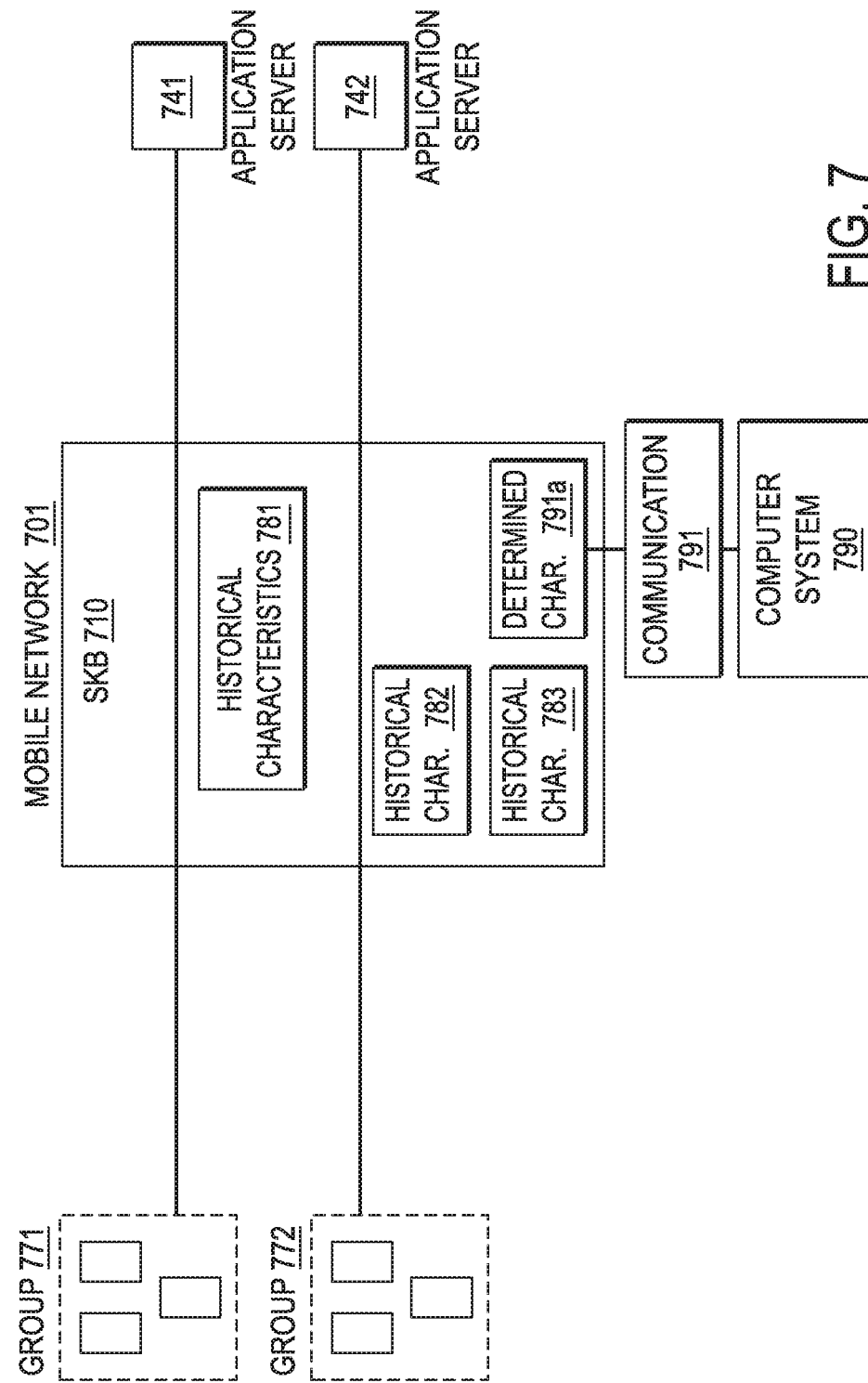
FIG. 7 is a flow chart depicting an exemplary system capable determining characteristics or patterns of behavior associated with multiple devices or servers.

FIG. 7 depicts an example of a system capable of determining characteristics or patterns of behavior associated with multiple groups of network-enabled devices and/or multiple application servers. The system may include an SKB 710, which resides within a core mobile network 701. For simplicity, the SKB 710 is depicted as including features related to encryption, decryption, authentication, and pattern detection. However, other configurations are possible. For example, features related to pattern detection may be performed by additional mobile network components, such as one or more security components. In addition, the features described with regards to SKB 710 may be included in a multi-purpose component of the mobile network 701.

Multiple groups of network-enabled devices may communicate with multiple application servers via mobile network 701. For example, network-enabled device group 771 and application server 741 may transmit communications via mobile network 701. In addition, group 772 and application server 742 may transmit communications via mobile network 701. Such communications may be transmitted via SKB 710, as described elsewhere herein.

SKB 710 may determine one or more patterns of activity associated with the transmitted communications. For example, SKB 710 may monitor communications between group 771 and application server 741, and analyze the communications. Based on this analysis, SKB 710 may determine that communications between group 771 and application server 741 have one or more historical characteristics 781. In addition, SKB 710 may monitor and analyze communications between communications between group 772 and application server 742, and, based on this analysis, determine that such communications have historical characteristics 782.

In some implementations, SKB 710 may determine additional historical characteristics or patterns of activity across multiple groups or multiple application servers. The additional historical characteristics or patterns may be associated with shared attributes of the groups or application servers, such as an industry attribute, a technology attribute, a user profile attribute, or other suitable attributes. For example, if groups 771 and 772 and application servers 741 and 742 are associated with public utility metering, a pattern of activity may be determined based on the industry type. SKB 710 may monitor and analyze communications across groups 771 and 772 and application servers 741 and 742. Based on the analysis of communications across multiple groups and/or multiple application servers, SKB 710 may determine that such communications have historical characteristics 783 relevant to their industry type.

SKB 710 may identify insecure communications based on one or more of historical characteristics 781, 782, or 783. For example, computer system 790 may transmit communication 791 via mobile network 701. SKB 710 may receive the communication 791, and may determine respective associated characteristics 791a. In addition, SKB 710 may compare the determined characteristics 791a with one or more of the historical characteristics 781, 782, or 783. Based on the comparison of the determined characteristics with the historical characteristics, SKB 710 may implement one or more protective actions.

For example, communication 791 may appear to be associated with one or more of groups 771 or 772, or with application servers 741 or 742. Communication 791 may include sensor data that appears to originate from group 771, or may indicate application server 742 as the intended recipient. The SKB 710 may determine that characteristics 791a are different from one or more of historical characteristics 781, 782, and 783. Based on determining that communication 791 includes characteristics 791a different from historical characteristics 781, 782, and 783, SKB 710 may identify communication 791a as insecure. In addition, SKB 710 may implement protective actions, such as modifying security information associated with groups 771 or 772 (e.g., security keys, APNs), alerting application servers 741 or 742 of potentially insecure activity, or blocking additional communications from computing system 790.

Figure 8:
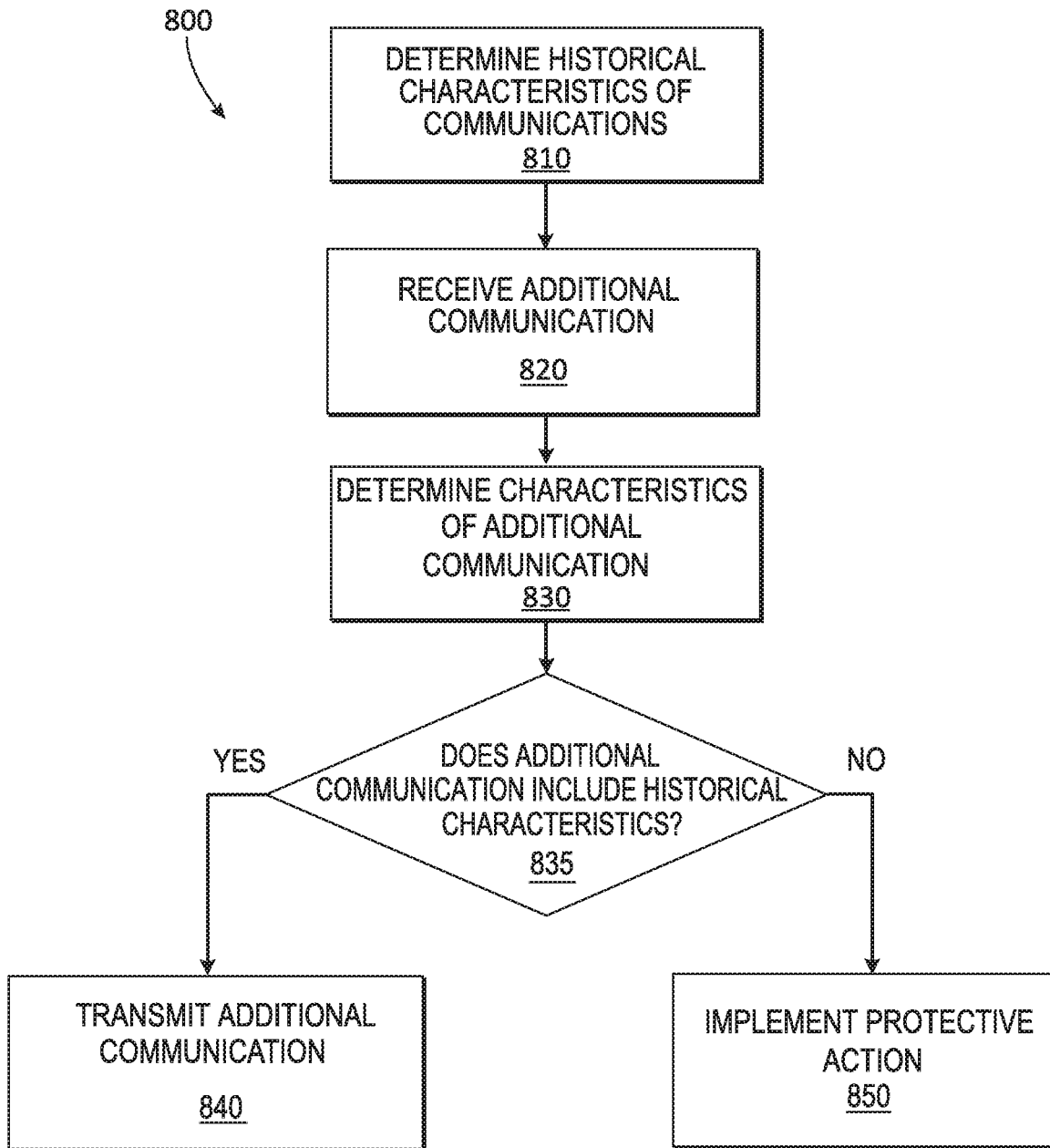
FIG. 8 is a flow chart depicting an example of a process for modifying multiple security keys based on communication characteristics.

FIG. 8 is a flow chart depicting an example of a process 800 for modifying multiple security keys based on communication characteristics or patterns of activity. In some implementations, such as described in regards to FIGS. 1-7, a computing device executing a security key broker implements operations described in FIG. 8, by executing suitable program code. For illustrative purposes, the process 800 is described with reference to the examples depicted in FIGS. 1-7. Other implementations, however, are possible.

A computing device implementing an SKB on a mobile network may transmit communications to or from multiple network-enabled devices or multiple application servers. At block 810, the process 800 involves determining one or more historical characteristics, such as characteristics associated with communications of a subset of the network-enabled devices, or of a subset of application servers, or both. In some cases, characteristics associated with the device subset may be similar to characteristics associated with the server subset. For example, one of the characteristics of the device subset may be that network-enabled devices included in the device subset communicate with application servers included in the server subset.

At block 820, the process 800 involves receiving an additional communication. The additional communication may appear to come from a network-enabled device included in the device subset, or may appear to come from an application server included in the server sub set.

At block 830, the process 800 involves determining one or more additional characteristics of the additional communication. At block 835, the process 800 involves determining whether the additional communication includes historical characteristics associated with the device subset or with the server subset. For example, the additional characteristics, as described with regards to block 830, may be compared to the characteristics of the subsets, as described with regards to blocks 810 and 815.

Responsive to determining that the additional communication includes characteristics associated with the device or server subsets, the additional communication may be transmitted, such as at block 840. Responsive to determining that the additional communication lacks characteristics associated with the device or server subsets, protective actions may be taken, such as at block 850.

At block 840, the process 800 involves transmitting the additional communication, such as to a recipient. Subsequent to transmitting the additional communication, process 800 may end operations, or may return to a previous operation, such as operations related to block 810.

At block 850, the process 800 involves implementing one or more protective actions related to the additional communication. For example, an protective action may include modifying security information associated with one or more network-enabled devices. In addition, protective actions may include providing notification of the additional communication, such as to an intended recipient. In addition, protective actions may include verifying the additional communication, such as contacting the sender to request identification or other verification.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system of managing a plurality of security keys for a plurality of network-enabled devices, the system comprising:
 a mobile communication node of a core mobile communication network, the node capable of communicating with the plurality of network-enabled devices;
 a key broker capable of communicating with the plurality of network-enabled devices via the node and capable of storing a plurality of security keys associated with the plurality of network-enabled devices, wherein the key broker is located within the core mobile communication network; and
 a mobile communication gateway of the core mobile communication network, the gateway capable of communicating with the key broker and with a plurality of application servers located outside the core mobile communication network, wherein:
  the node receives an unencrypted communication from a first device of the plurality of network-enabled devices, wherein the unencrypted communication is transmitted via an in-band communication channel of the core mobile communication network,
  the unencrypted communication is encrypted by the key broker using a first key of the plurality of security keys,
  the encrypted communication is transmitted to the gateway for delivery to a first application server of the plurality of application servers,
  the gateway provides the encrypted communication to the first application server located outside the core mobile communication network,
  the key broker receives a second communication from the first application server via an out-of-band communication channel of the core mobile communication network, and
  the first security key is modified by the key broker responsive to receiving the second communication.

2. The system of claim 1, wherein the key broker is further capable of:
 using the modified first security key to encrypt data communications between the first device and the first application server.

3. The system of claim 1, wherein the key broker is further capable of:
 determining one or more characteristics of a set of communications between a subset of the plurality of network-enabled devices and a subset of the plurality of application servers; and
 responsive to determining that an additional communication between the device subset and the server subset does not include the one or more determined characteristics, modifying a subset of the plurality of security keys, wherein each security key in the subset of modified keys is associated with a respective network-enabled device in the device subset.

4. The system of claim 3, wherein the key broker is further capable of:
 providing, to one or more application servers in the server subset, an alert indicating the modification of the subset of the plurality of security keys.

5. The system of claim 1, wherein the key broker is further capable of:
 communicating with the first device via a first access point name indicating a first segment of the core mobile communication network; and
 communicating with a second device of the plurality of network-enabled devices via a second access point name indicating a second segment of the core mobile communication network.

6. The system of claim 1, wherein, prior to encryption, the unencrypted communication is authenticated by the gateway.

7. The system of claim 6, wherein authentication of the unencrypted communication includes determining an access point name associated with the first device, wherein the access point name indicates a segment of the core mobile communication network.

8. The system of claim 1, wherein a first component of the core mobile communication network includes the key broker, and a second component of the core mobile communication network includes the gateway.

9. The system of claim 1, wherein the key broker and the gateway are included in a component of the core mobile communication network.

10. A method of managing a plurality of security keys for a plurality of network-enabled devices, the method including operations performed by at least one network component included in a core mobile communication network, the operations performed by the at least one network component comprising:
 receiving, via a mobile communication node of the core mobile communication network, an unencrypted communication from a first device of the plurality of network-enabled devices, wherein the unencrypted communication is transmitted via an in-band communication channel of the core mobile communication network;
 encrypting, by a key broker of the core mobile communication network, the unencrypted communication, wherein the key broker is capable of storing a plurality of security keys associated with the plurality of network-enabled devices, and wherein the unencrypted communication is encrypted using a first key of the plurality of security keys;
 transmitting the encrypted communication to a mobile communication gateway of the core mobile communication network, wherein the gateway is capable of communicating with the key broker and with a plurality of application servers located outside the core mobile communication network;
 providing, by the gateway, the encrypted communication to a first application server located outside the core mobile communication network;
 receiving, by the key broker, a second communication from the first application server via an out-of-band communication channel of the core mobile communication network; and
 modifying, by the key broker and responsive to receiving the second communication, the first security key.

11. The method of claim 10, wherein the operations performed by the at least one network component further comprise:
 encrypting, by the key broker and using the modified first security key, data communications between the first device and the first application server.

12. The method of claim 10, wherein the operations performed by the at least one network component further comprise:

determining, by the key broker, one or more characteristics of a set of communications between a subset of the plurality of network-enabled devices and a subset of the plurality of application servers; and responsive to determining that an additional communication between the device subset and the server subset does not include the one or more determined characteristics, modifying, by the key broker, a subset of the plurality of security keys, wherein each security key in the subset of modified keys is associated with a respective network-enabled device in the device subset.

13. The method of claim 12, wherein the operations performed by the at least one network component further comprise:

providing, by the key broker and to one or more application servers in the server subset, an alert indicating the modification of the subset of the plurality of security keys.

14. The method of claim 10, wherein the operations performed by the at least one network component further comprise:

communicating, by the key broker, with the first device via a first access point name indicating a first segment of the core mobile communication network; and communicating, by the key broker, with a second device of the plurality of network-enabled devices via a second access point name indicating a second segment of the core mobile communication network.

15. The method of claim 10, wherein, prior to encryption, the unencrypted communication is authenticated by the gateway.

16. The method of claim 15, wherein authentication of the unencrypted communication includes determining an access point name associated with the first device, wherein the access point name indicates a segment of the core mobile communication network.

17. The method of claim 10, wherein a first component of the core mobile communication network includes the key broker, and a second component of the core mobile communication network includes the gateway.

18. The method of claim 10, wherein the key broker and the gateway are included in a component of the core mobile communication network.

* * * * *